Figure 1:
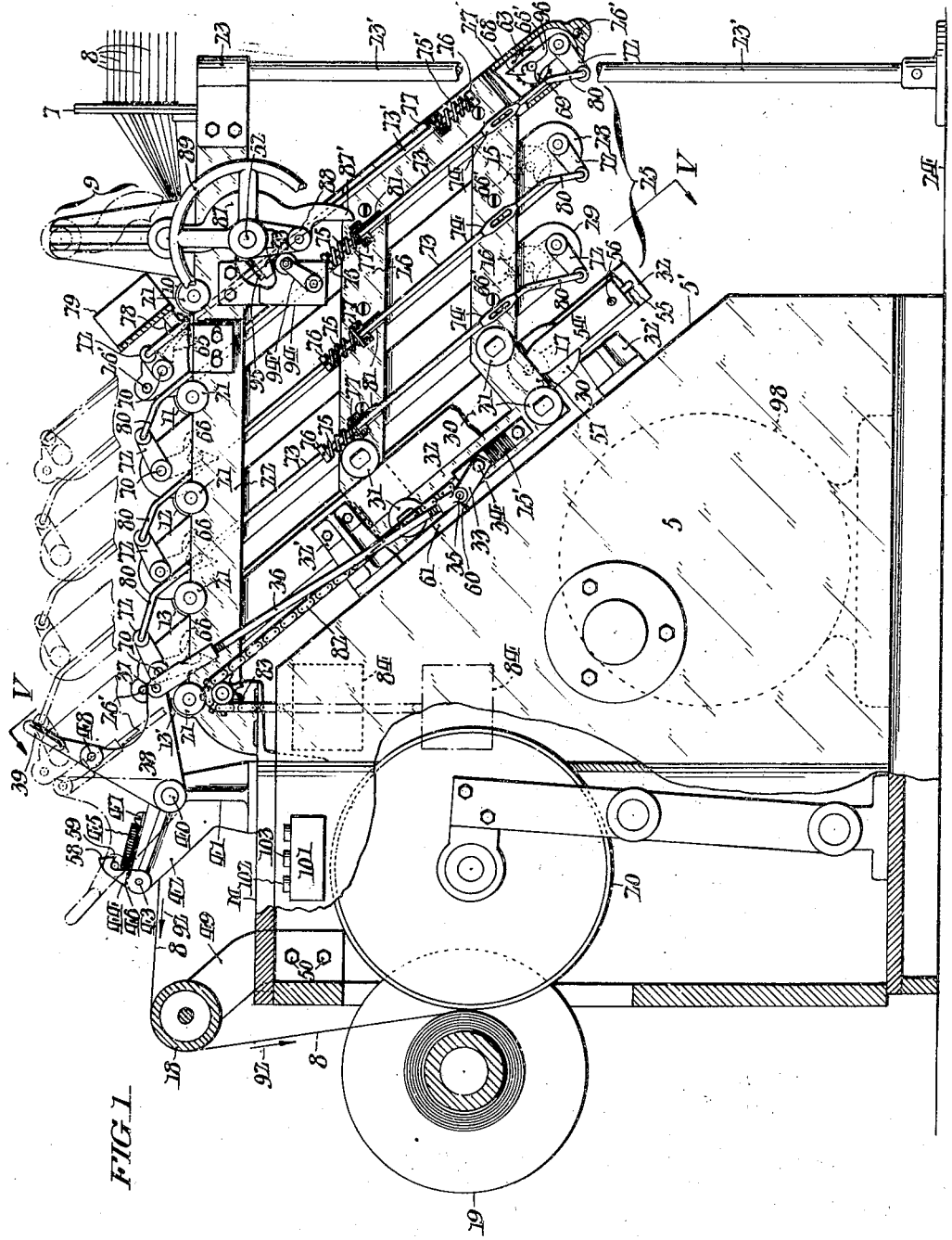

Dec. 13, 1949  J. C. BODANSKY  2,491,438
BEAM WARPER ACCUMULATOR OR STORAGE ROLLS
Filed Aug. 25, 1947  5 Sheets-Sheet 1

WITNESSES:
Thomas W. Kerr, Jr.
A. J. Brittingham

INVENTOR:
John C. Bodansky,
BY  Paul & Paul
ATTORNEYS.

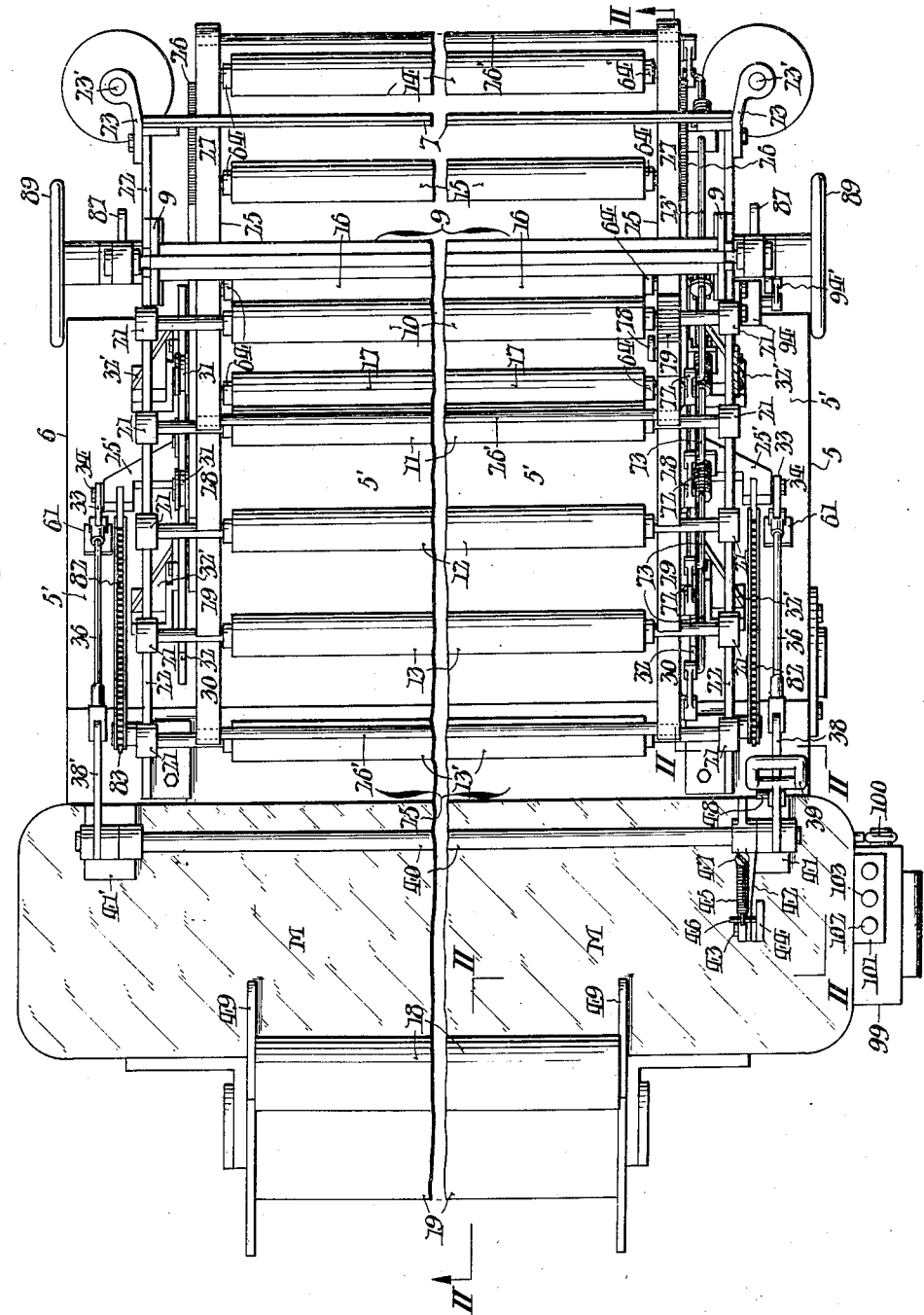

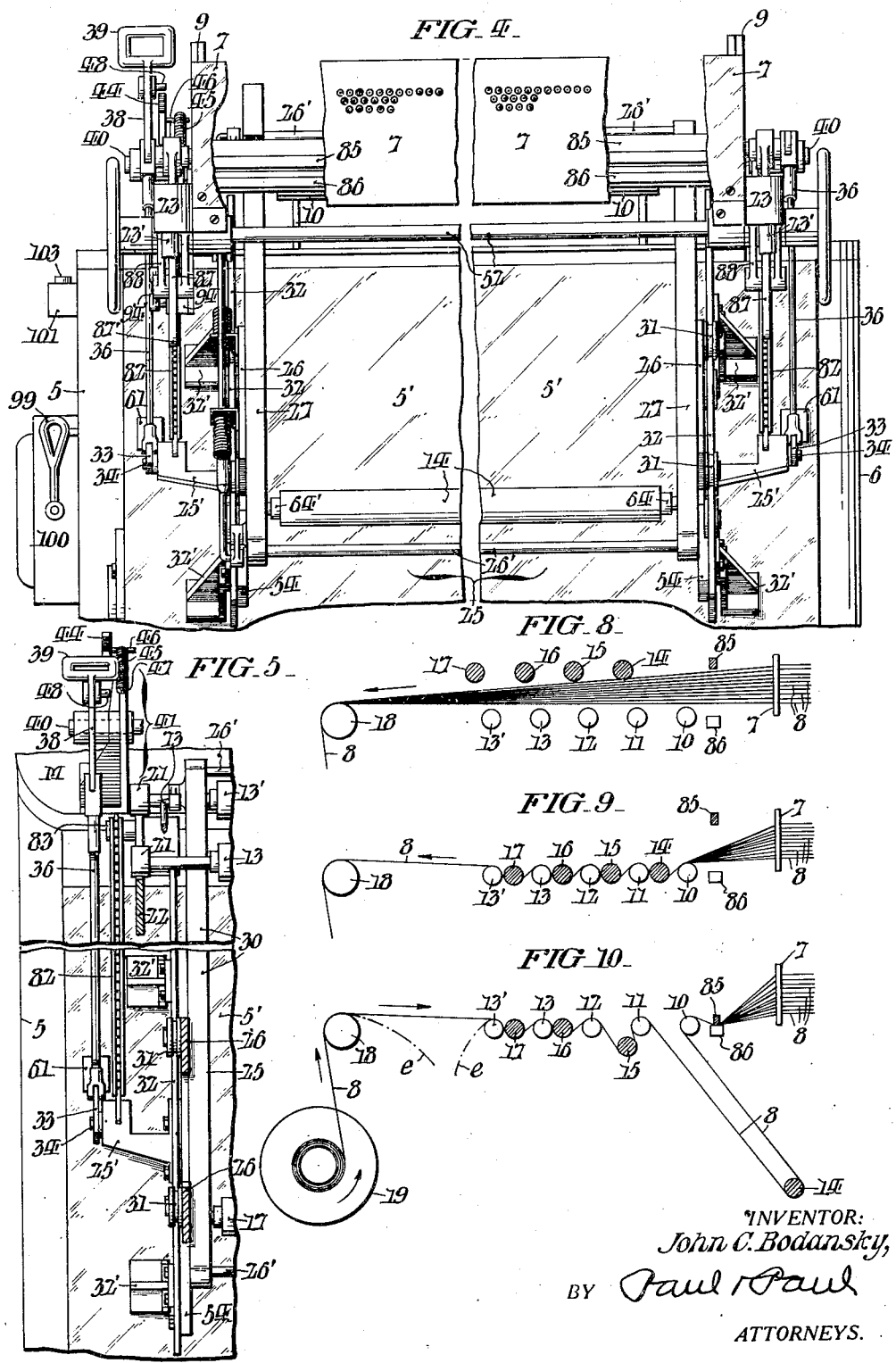

Dec. 13, 1949 J. C. BODANSKY 2,491,438
BEAM WARPER ACCUMULATOR OR STORAGE ROLLS
Filed Aug. 25, 1947 5 Sheets-Sheet 5

INVENTOR:
John C. Bodansky,
BY Paul & Paul
ATTORNEYS.

UNITED STATES PATENT OFFICE 2,491,438

BEAM WARPER ACCUMULATOR OR STORAGE ROLLS

John C. Bodansky, Gastonia, N. C., assignor to Cocker Machine and Foundry Company, Gastonia, N. C., a corporation of North Carolina Application August 25, 1947, Serial No. 770,490

16 Claims. (Cl. 28—32)

This invention has general reference to apparatus or devices used in the textile and kindred industries for the purpose of beaming multiple yarns or threads from a source of supply, or a creel, onto spools or the like preparatory to subsequent weaving or processing; while it relates, more particularly, to the species or form of such winding means conventionally known as beam warpers that include accumulator rolls, alternate of which are capable of being planarly movable relative to the others to festoon the yarns or threads in order to facilitate location and the reunion of a broken yarn or thread whenever such a contingency arises.

The fundamental aim or object of my present invention is to provide a novel beam warper accumulator means including an arrangement of stationary and intervening carrier-sustained rolls, with associated means whereby the latter rolls are individually and consecutively released for gravitation in one direction and, contrariwise, automatically returned to normal beaming location.

Another object of this invention is to provide a novel assembly of spaced stationarily-mounted freely-rotative accumulator rolls with alternating carrier-sustained inclinedly-gravitational drop-rolls, and associated means whereby the initially released drop-roll, on approaching the low level of its movement, automatically releases the adjoining drop-roll for corresponding movement, and so on consecutively until the requisite number, or all, of said drop-rolls have been lowered.

A further object of this invention is to provide a novel arrangement of accumulator-rolls, as defined in the preceding paragraph, wherein the several drop-rolls are automatically restored to their normal beaming or elevated location in reverse sequence to the order of their gravitational descent.

A still further object of this invention is to provide an improved beaming warper including refinements and/or devices whereby it may be wholly, or substantially so, operated and controlled by power and manually activated means, as desired or expedient.

While the foregoing definitions are indicative, in a general way, of the aims of this invention; other objects, with ancillary advantages will be evident to those skilled in the art upon a full understanding of the construction, arrangement, and operation of the typical means hereinafter fully disclosed; but it will also be appreciated that my invention is susceptible of other embodiments or structurally modified forms coming equally within the terms and scope of the claims.

In the accompanying drawings:

Fig. 1, Sheet 1, is a side elevation of a conventional warper having the accumulator-rolls arranged in accordance with a preferred embodiment of my invention, said elevation illustrating the right-hand side of the warper with parts broken out for a clearer showing of otherwise hidden features.

Figure 2:
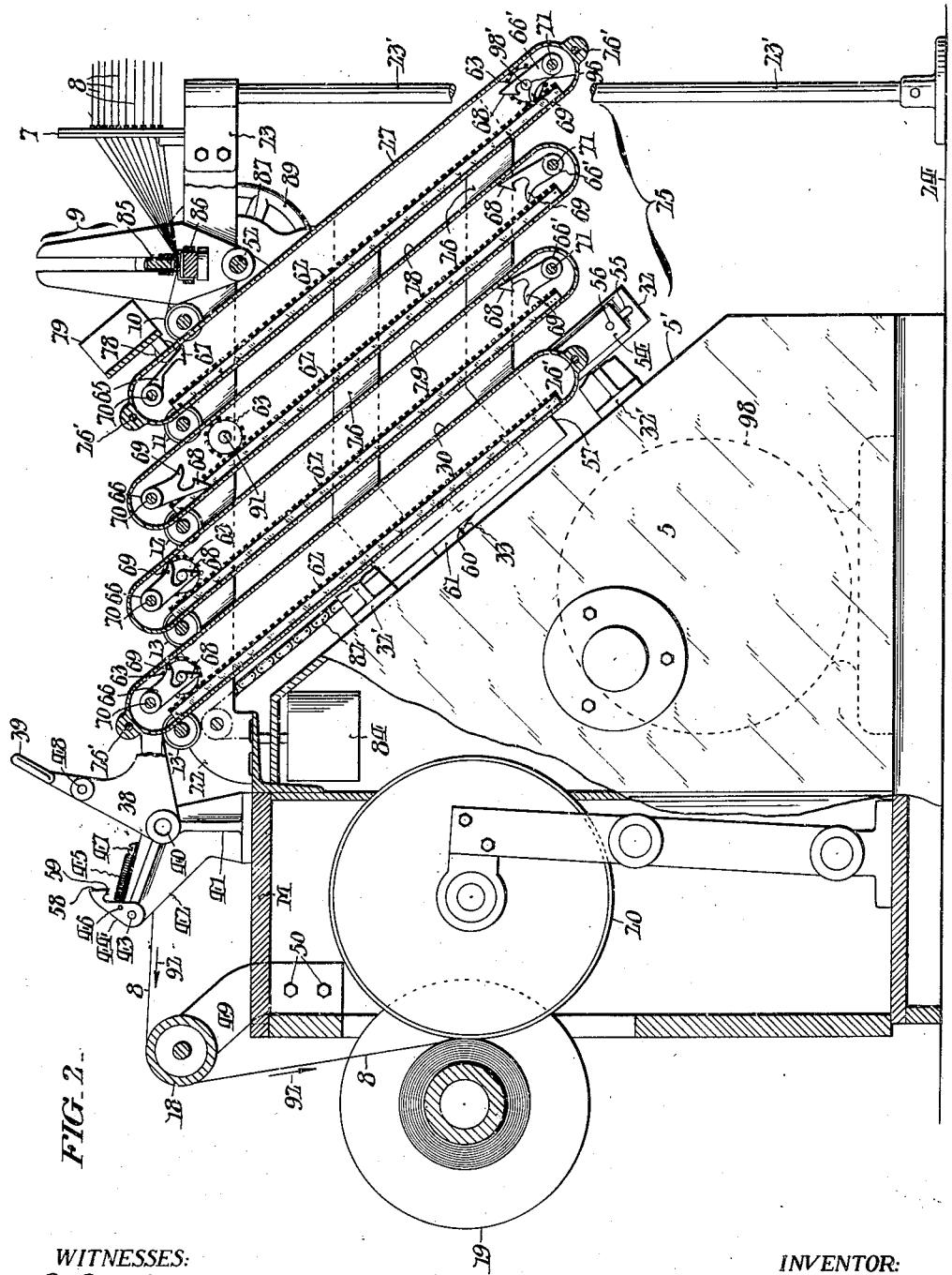

Fig. 2, Sheet 2, is a somewhat similar view to the preceding, taken approximately as indicated by the staggered arrows II—II on Fig. 3, or with the right-hand accumulator-roll releasing means removed and showing the gravitational drop-rolls in differing location to better facilitate a clearer understanding of their related movements.

Fig. 3, Sheet 3, is a broken top plan view of Fig. 1.

Fig. 4, Sheet 4, is a broken end elevation of the upper portion of the warper as viewed looking from the right-hand towards the left-hand of Fig. 1.

Fig. 5 is a fragmentary broken plan view taken on the inclined plane designated V—V in Fig. 1.

Figure 6:
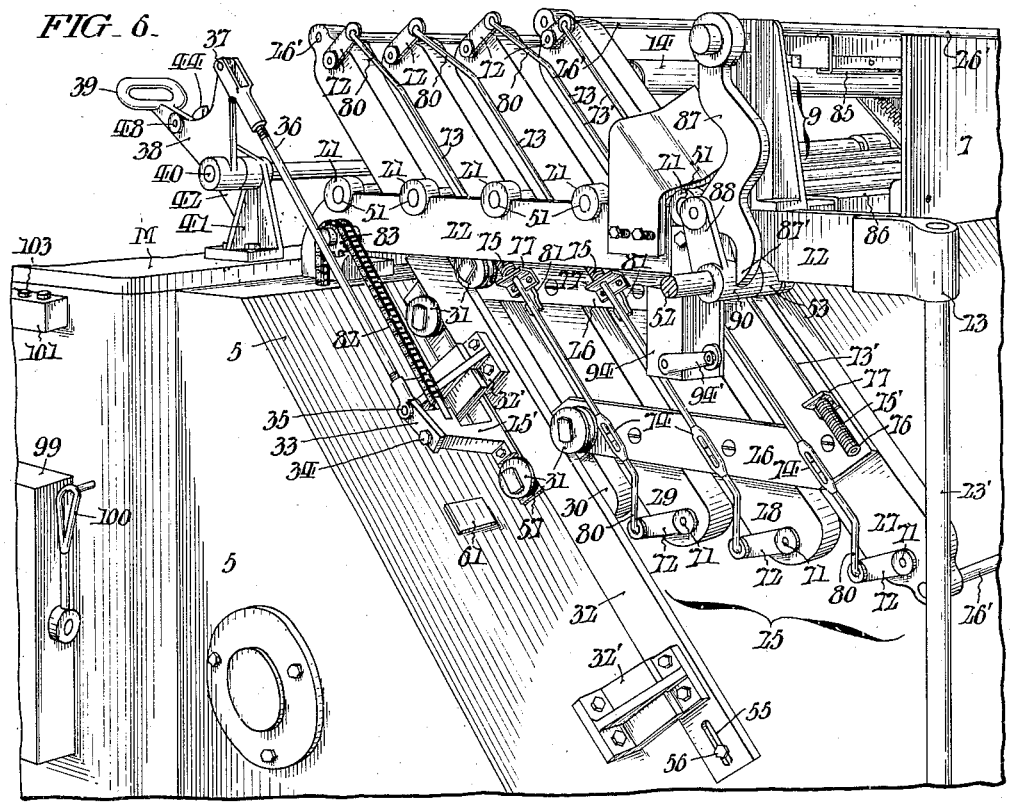

Fig. 6, Sheet 5, is a perspective view looking downward toward the right-hand upper rear corner-portion of the warper.

Figure 7:
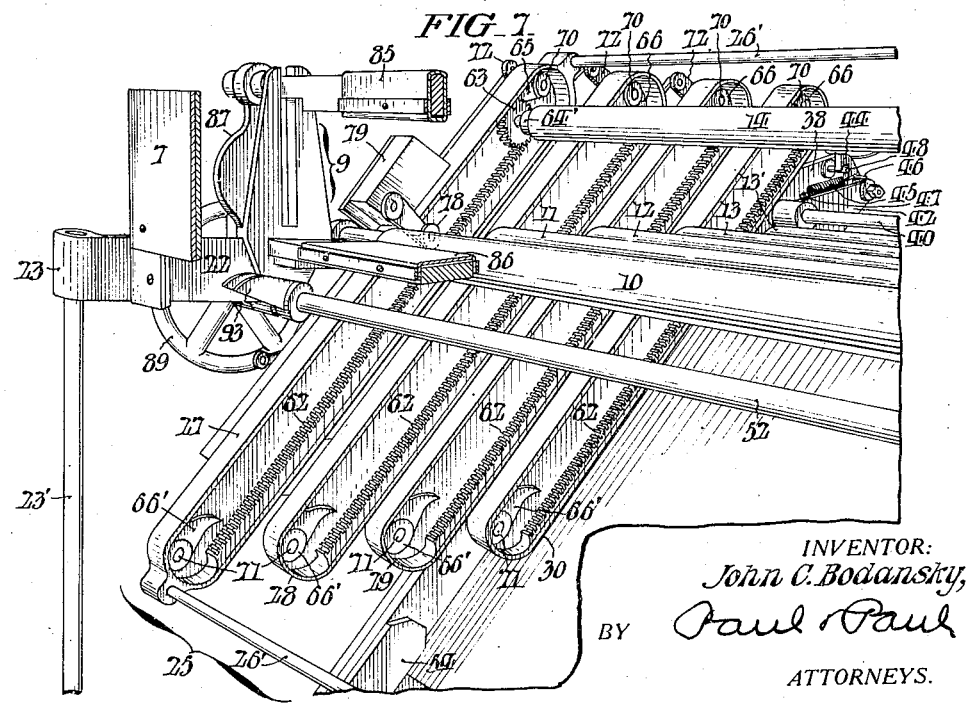

Fig. 7 is a perspective view looking downward from the left hand toward the right-hand of the movable accumulator rolls; and, Figs. 8 to 10, Sheet 4, are diagrams illustrative of operating phases of my invention which are hereinafter fully described.

In describing the typical embodiment of this invention, shown by the accompanying sheets of illustrative drawings, specific terms will be employed for the sake of clarity, but it is to be understood the scope of said invention is not thereby limited; each such term being intended to embrace all reasonable equivalents which perform the same function for an analogous purpose.

Referring more in detail to the drawings, the reference characters 5, 6 respectively designate the spaced side frames of a known type of warper embodying the novel features of my invention; said warper including an eye-board 7 through which the yarns or threads, indicated by the lines 8, are drawn, from a source of supply such as a creel—not shown, to a clamp-device 9 and from thence by an undulatory course over a plurality of spaced stationarily-mounted accumulator-rolls 10, 11, 12, 13 and 13' and under intervening drop-rolls 14, 15, 16 and 17; and from the latter over a measuring roll 18 to a spool or beam 19, as indicated by the small associated arrows, upon which said yarns or threads 8 are collected in accordance with known procedure; while 20 designates the conventional presser-roll.

The stationary accumulator-rolls 10—13' are supported, with capacity for free rotation by aid of anti-friction bearings 21, at their respective ends, which are all sustained by opposing brackets 22, in turn appropriately attached to, or formed integral with, the side frames 5, 6 or forward extensions 23 therefrom with supporting posts 23' fixed to the floor 24 in advance of said side frames.

Suitably mounted across the inclined parts or lateral face 5', of the warper side frames 5, 6 is a carriage comprehensively designated 25 and comprising vertically spaced side members 26 and inclined runways 27, 28, 29 and 30, rigidly secured in parallel relation as by tie-rods 26'; the whole assembly being sustained by appropriate traction means such as vertically spaced flanged rollers 31, jointly coactive with the upper and lower edges of bar-rails 32; said rails being, in turn, rigidly supported by shouldered brackets 32' rigid with the side frames 5, 6 aforesaid, see Figs. 4–6 to best advantage. The carriage 25 is capable of being raised and lowered on the rails 32 by power actuated means, or manually by aid of a link 33, on each side thereof, pivoted at 34 to a rigid laterally-projecting bracket 25' from said carriage. Each link 33 is articulated at 35, or has pivotal connection, to the one end of an associated actuator-rod 36, said rod 36 in turn, having a similar connection 37, at the right-hand side of the beamer, to an angle-lever 38 embodying a hand-grasp 39 and at the left-hand side of said beamer to a rock-arm 38'; see Fig. 3 to best advantage, and both of which are fast on a common operating shaft 40, journaled in appropriate bearing backets 41, 41' secured on the warper frame rear end bracing element or cross member M, Figs 1–3, for example. The bracket 41, it is to be noted, embodies an angular projection 42 affording pivotal attachment at 43 for a hook or latch 44, under the influence of a tension spring 45 suitably connected to a lateral pin 46 coactive with the upper surface of the bracket extension 42, and at 47 to said extension; while the angle lever 38 is provided with a lateral stud 48 or the like 48 for engagement by the latch 44, as later on again referred to. Incidentally, it will be observed that the measuring roll 18 is supported by appropriate brackets 49, secured to the side frames 5, 6 by attaching means 50, Figs. 1 and 2 in an obvious manner.

The carriage 25 is preferably, although not essentially, progressive along the bar rails 32 on the warper side-frame inclined lateral faces 5', as readily understood by those conversant with the art. The side bar rails 32 are fitted, preferably at their lower inner end portion with stop elements 54 having capacity for lengthwise adjustment by aid of elongated slots 55 and lock studs 56, such stop elements serving to limit the downward travel of the carriage 25, by abutment thereon of the angled extensions 57 of the lower frame side members or components 26, as well understandable on an examination of Figs. 1 and 2, more particularly. Now it will be clear that when the carriage 25 is in the lowered position shown, it seats on the stop elements 54, at the predetermined adjustment of the latter; whereas when the carriage 25 is elevated to the dot-and-dash line indicated position of Fig. 1 it is supported by the links 33, actuator-rods 36, angle-lever 38 and rock-arm 38', when the latter are turned or moved counter-clockwise until the latch 44 engages over the lateral stud 48 on said lever or levers. In this connection, it is to be observed that the hook-latch 44 is provided with an inclined face 58 in the path of movement of the stud 48 which, as the lever 38 rocks outwards or to the left-hand, engages said stud and by camming action turns said latch 44 on its pivot 43 until the tip portion 59 snaps over the stud 48 under recoil influence of the spring 45. The relatively upper or flat end 60 Figs. 1, 3 and 5 of the link 33, it is to be noted, serves when the carriage 25 is in the lowered position to lock and hold said carriage stationary by snap engagement against the lower edge of an appropriate stop or stops 61 projecting from the adjoining side frame lateral faces 5' or when the parts 33, 36 are disaligned as best shown in Fig. 1.

Referring back again to the runways 27—30, see Figs. 2, 6 and 7 to best advantage, it will be observed they are each equipped with a toothed-rack 62, with which engage pinions 63 on the ends of the associated drop-rolls 14—17, whereby said rolls are individually maintained horizontal and enabled to evenly and smoothly gravitate downwards. Note is to be had that the drop-rolls 14—17 are anti-frictionally-journaled, at their outer ends, by appropriate bearings 64 incorporated with said drop-rolls. In order to hold the several drop-rolls 14—17 elevated or lowered, I conveniently make use of a leading hook-device 65 and special hook-devices 66, 66' in the upper and lower ends of the runways 27—30 respectively; the leading device 65 including a suspension portion 67; whereas all of the other devices 66 and 66' are of prong-like formation; that is to say each said device 66 and 66' embodies a portion 68 serviceable as a suspension or latching means and an associated opposingly-related cam or trip-claw 69, the purposes whereof are hereinafter further clarified. From Fig. 2 it will be seen that the upper series of hook-devices 65, 66 are downwardly directed relative to their pivotal axes 70; whereas the lower series 66' are upwardly directed relative to their corresponding axes 71. All of the axes 70, 71 are pivotally journaled through the adjoining side wall of the respective hollow runways 27—30 for attachment thereto of an individually associated actuator lever 72, see Figs. 1 and 6 more particularly, for operative co-ordination by aid of associated unitary or bipartite-rods 73, 73' respectively, the former 73 having their aligned ends joined together by individual turnbuckles 74, whereby said rods 73 may be lengthwise adjusted in an obvious manner. At this juncture it is to be noted that the leading rod 73' of the right-hand hook-device 65 is subject to influence in one direction by a spring 75' effective to operate the said device 65; such spring being conveniently located intermediate a collar 76, fast on the rod 73', and a stationary bracket 77 through which said rod passes. On the other hand corresponding means 75, 76 and 77 associated with the bipartite rods 73 function only to counter-balance the weight of said rods 73 and associated hook-devices 66, 66'. The other or consecutive prong-like hook-devices 66 in the runways 27—30, are connected at the bottom and top with those of the respectively adjacent runways; that is to say, the hook device 66' in the lower end of the foremost runway 27 is connected with the opposingly-related hook-device 66 in the upper end of the immediately rearward runway 28, and so on consecutively throughout the series of such runways; it being observed that the ends of the bipartite rods 73 are angled or off-set at 80 in order to by-pass the shafts 51 of the stationary rolls 10—13 and the traction wheels 31 of the carriage 25. It is also to be further remarked that the bipartite rods 73 have imparted thereto a "snubbing" action by aid of flat-springs 81 flanking the same, such springs 81 being conveniently held in place by the brackets 77; or said springs may be secured to the carriage side members 26, in an obvious manner.

The carriage 25 as well as the parts carried thereby, as an assembly, are conveniently counterbalanced by aid of pliable means such as a chain or chains 82 trained over an idler-sprocket or sprockets 83, suitably journaled intermediate the side frames 5, 6, having an attached weight or weights 84 suspended thereby, as readily understood by those conversant with the art.

Referring now to the yarn or thread clamping device comprehensively designated 9, the same comprises upper and lower jaws 85, 86 respectively, the former 85 being raised and lowered relative to the latter 86 by means of special toggle-links 87, 88 respectively operable by means of a transverse shaft 52 across the beamer frame forward extensions 22, having end hand wheels 89, see Figs. 2-4, and 7 to best advantage. Now it will be readily apparent that, as the toggle-links 87, 88 are expanded by turning either of the handwheels 89 in the requisite direction it will cause or swing an extension finger 87' of the toggle part 87 into contact with the inner hub portion 90, of the other link 88 to hold the upper clamping jaw 85 elevated as shown in Fig. 6 to best advantage and clearly understandable by those acquainted with such devices.

In the position shown by Fig. 1, when the hand-wheel 89 is turned clockwise, for instance, to clamp the yarns or threads 8 between the jaws 85, 86, a fork-ended arm 93 fast on the shaft 52, carrying said hand-wheel, engages below a collar 95 on the leading rod 73' and raises the latter to release the associated hook-device 65 from the front or right-hand drop-roll 14, whereby said drop-roll is freed to descend and come to rest on the lay of yarns or threads thereunder. If the warper is now started, in "reverse-jog," the beam 19 will unwind the lay of yarns or threads 8 thereon and allow the drop-roll 14 to gravitate down the toothed racks 62 in the opposed runways 27, with uniform maintenance of said yarns or threads taut and, as such jog-reversal of the beam 19 continues the drop-roll 14 will encounter the latch portion 68 of the associated hook-device 66' and slip into the notch 96 intervening said portion 68 and cam or trip-claw 69 and thereby rock said hook-device 66' with its latch portion 68 into arrestive engagement above the respectively coactive end of the right hand drop-roll axis portion 98' as readily understood by those conversant with the art. As a result of the action just explained, the leading bipartite rod 73 is actuated and rocks the upper hook-device 66 on its axis portion 91 Fig. 2, in the top of the adjoining runway 28, to thereby release the succeeding drop-roll 15 which, in turn, will similarly have an initial drop and then gravitate down the associated toothed rack 62. As the drop-roll 15, disengages from the upper hook-device 66 in the runway 28, the ends of its axis portions 91 push, and roll or move away from engagement with the suspension-latching portion 68, and have a final trip movement which is in turn transmitted to the associated bipartite rod 73 and thus completes the oscillatory movement of the lower hook-device 66 in the runway 27 to ensure positive latching of said drop-roll in its bottom position. Now it will be readily understood that, when the drop-roll 15 reaches the lower end of the runway 28 it will, in turn, release the next drop-roll 16 in the top of runway 29, as aforesaid; and so on with respect to the drop-roll 17, or until the series of such rolls have been consecutively released.

Referring again to Fig. 1 the path or course followed by the yarns or threads 8 from supply through the eye-board 7, to the clamp device 9, over the leading stationary accumulator-roll 10, down runway 27, thence under leading stationary drop-roll 11, is followed by festoon-like progression over the following stationary rolls 12, 13 and under the successive drop-rolls 15—17, up to and over the trailing roll 13' as well as the measuring-roll 18, thence down and around the spool or beam 19, as all indicated by the associated small arrows 92.

When any, or all, of the drop-rolls 14—17 are in the low position and the warper is started in forward "jog" to rewind the lay of yarns or threads 8 back onto the beam 19, said drop-rolls 14—17 are raised or pulled-up consecutively, but in reverse order, beginning with roll 17 and following one by one to roll 14, or that nearest the clamp-device 9.

The operation of the hook-devices 66, 65 is identical when rewinding the yarns or threads 8, onto the beam 19, as the operation of unwinding said yarns or threads therefrom, inasmuch as each drop-roll 14—17, on reaching the upper end of the respectively associated runway 27—30, unlatches the next succeeding drop-roll, and latches itself in the upper position, until the festooned lay of yarns or threads 8 has elevated all the drop-rolls 14—17 to coplanar relation with respect to the associated accumulator rolls 10—13'. As the forward drop-roll 14 attains its upper level, the hub-bearing 64', Fig. 7, on the leading roll 14 impacts a roller 78 on the actuator arm of a limit-switch 79 to move said arm and break the "jog" circuit, hereinbefore mentioned, of the drive motor 98 for the beam warper, stopping the re-winding of the yarn or thread 8 and preventing breakage thereof. If the angled-lever 38 be now operated to elevate the carriage 25, the actuator-rod 36 will first draw the link 33 clear of the stop 61 into alignment therewith and thus enable said carriage to be drawn-up to the upper level—indicated by dot and dash lines—of Fig. 1, and latched in such position by engagement of the lateral stud 48 with the hook-latch 44. This raising of the carriage 25 also pulls the leading rod 73', near the clamp-device 9, with its collar 95 upwards and thereby liberates the spring 75' to exert its influence on said rod 73', with resultant movement of the leading hook device 65 into latching engagement with the ends of the leading drop-roll axis 98' thereby holding said roll up clear of the lay of yarn or thread thereunder. When the drop roll 14 is raised, as just described, it also, by aid of collar 64', releases the switch lever arm 78' of the limit switch 79 and thereby recloses the "jog" circuit of the drive motor 98. After raising the carriage 25, the operator turns either of the hand-wheels 89 counter-clockwise, which actuates the toggle-means 87, 88 to open the clamp jaws 85, 86 for release of the lay of yarn or thread 8, with concurrent movement of the toggle portion 88 away from engagement with the roller 94' controlling the limit-switch 94, said switch thereby automatically closing the running circuit of the drive motor 98, whereupon the warper is ready for normal operation.

At this juncture, it is to be noted I have so far referred to two limit switches as involved in the improved beamer shown, namely the switches 79 and 94, and that they are both automatically controlled, but it is equally obvious that another, or more, limit switches may be installed where necessary or desirable; for example, a third switch may be located and operated by the drop-roll 17 as it attains its low level to terminate the forward "jog" and automatically restore the reverse "jog." Furthermore the accumulator rolls 10—13' are all freely preferably rotative on stationary axes or shafts. The main or operating motor 98 may be, conveniently, under the control of a suitable reversing switch 99 shiftable by a hand-lever 100, see Fig. 3 and Fig. 4, although said switch may otherwise be operated; while 101 designates a standard type multiple-switch panel equipped with "jogging" push buttons 102, 103 at the right hand side of the beamer or elsewhere located for convenience of the operator.

Assuming now, as previously set forth, that the carriage 25 is in the normal or up-position and the beamer set in operation by depression of the suitably designated starter-button 102, whenever a yarn or thread break occurs said beamer is automatically stopped, in accordance with known procedure, whereupon the operator promptly moves the hand-lever 100 to reverse the motor 98, and then lowers the carriage 25 by aid of the angle-lever 38 which brings up the "loose" end onto the beam 19. The operator now lowers the clamp jaw 85 and presses the reverse "jog" as the motor 98 reverses, the bear 19 is also rotatively reversed; while the drop-roll 14 is freed for descent, followed consecutively by the drop rolls 15—17, as hereinbefore explained until the broken yarn or thread ends are drawn together and knotted. The operator next reverses the motor 98 by means of the switch 99, and presses the forward "jog" button 103 and thereby elevates the drop-rolls 17—14, as aforesaid. Note is to be had that as the drop rolls 17—14 are drawn up stagewise, the roll 14 on reaching its top position, automatically effects complete stoppage of the machine; whereupon the operator moves the angle-lever 38 to lift the carriage 25, and raises the clamp jaw 85 which simultaneously releases the yarn or threads 8, and restores the running circuit, whereupon the machine is now ready for normal operation. In this connection Fig. 8 diagrammatically portrays the direction of the travel of the yarns or threads 8 from the source of supply through the eyeboard 7 to the measuring roll 18 with the drop-rolls 14—17 cross-hatched for the purpose of clearer distinction over or above the stationary accumulator rolls 10—13'; or, otherwise expressed, in their respective positions for normal operation of the warper. Fig. 9 shows the relative locations of the parts just referred to immediately the drop-roll carriage 25 has been lowered incidental to the detection of a broken yarn or thread and preparatory for the reverse "jogging" of the spool or beam 19 to bring-up the broken end; while Fig. 10 illustrates how the consecutive drop-rolls 10—17 are consecutively permitted to gravitate until the loose ends e, e of the broken yarn or thread 8 are ultimately located for convenient knotting by the operator, as readily understood by those conversant with the art.

From the foregoing it will be readily seen that, by my improvements, there is provided a beam warper in which the clamp-device 9 must be in the yarn or thread-gripping position before the carriage 25 can be raised or lowered, and that said clamp device is supported by the machine side-frames independent of the carriage 25, while the latter is raised and lowered. It is also to be particularly noted that the clamp-device 9 is operated independently relative to the other parts of the warper; while it is to be understood that said clamp device may be actuated by a separate motor, or other suitable means, without departing from the intended scope of my invention.

It is also felt that, from the foregoing disclosure the merits and efficiency of the improved warper, will be clearly apparent to those conversant with the art; and while I have shown and described one particular embodiment thereof, it is to be further understood that changes and variations in adapting this invention to different species of beam warpers are hereby contemplated, or as may be fairly embraced within the terms and scope of the following claims.

Having thus described my invention, I claim:

1. In yarn or thread beaming means, a series of freely rotative accumulator-rolls alternate of which are mounted on stationary axes with the intervening ones suspendedly-supported; means whereby the suspendedly-supported rolls are consecutively-releasable for gravitational descent; means operative to elevate the descended rolls in reverse sequence; and means effective to hold the last mentioned rolls elevated or lowered.

2. In apparatus for beaming yarns or threads, a series of accumulator-rolls normally restrained in spaced relation; stationary means rotatively-sustaining alternate of said rolls with the intervening ones suspendedly-supported for gravitational movement; means effective to raise the descended rolls in reverse sequence; and means operative to releasably hold the suspendedly-supported rolls elevated or lowered.

3. In apparatus for beaming yarns or threads, a series of accumulator rolls normally restrained in spaced relation; stationary means rotatively-sustaining alternate of said rolls with the intervening ones suspendingly-supported by a movable carrier in spaced relation to the stationarily sustained rolls; means operative to consecutively release the carrier-supported rolls for gravitational descent; means effective to successively raise the descended rolls in reverse order; and means operative to move and hold the carrier elevated, or lowered to a definite level.

4. In apparatus for beaming yarns or threads, a series of accumulator-rolls normally restrained spacedly horizontal; stationary bearings rotatively-sustaining alternate of said rolls, with the remainder suspendingly-supported by a vertically movable carriage; means operative to successively release the suspendingly-supported rolls for independent gravitation to a common level; means effective to consecutively elevate the rolls in reverse sequence; and means actuable to raise and hold the carriage in position for normal operation of the apparatus, or at a determinate low level for uniting a broken yarn or thread whenever such a break occurs.

5. In apparatus for beaming yarns or threads, a plurality of rotative accumulator-rolls in spaced parallelism; a carrier suspendedly-supporting alternate of said rolls; means operative to collectively release the carrier-borne rolls for an initial drop, followed by consecutive gravitational descent to a lower level along spacedly related inclined planes; means operative to effect individual elevation of the carrier-borne rolls, in reverse order of progression, along said inclined planes; and shifter means whereby the carrier is raised and held-up, during normal operation of the apparatus, or lowered to temporarily retract a portion of the beamed yarns or threads to effect the juncture of a broken one.

6. In machines for beaming yarns or threads, a plurality of rotative accumulator-rolls divided between and constrained in vertically spaced planar relation when the machine is not operating; stationary bearings rotatively-sustaining alternate of said rolls; a vertically-movable carriage with means affording suspension-bearing for the relatively intervening rolls; means affording inclined guidance for the movable carriage; means operative to release the carriage-borne rolls, for a limited initial drop onto the yarns or threads, passing through the machine; means to individually release the carriage-borne rolls for consecutive inclined gravitation to a common lower level; means operative to individually elevate the carriage-borne rolls in reverse sequence to their order of gravitational descent; and means actuable to elevate and arrest the carriage-borne rolls at a level for normal operation of the apparatus and to temporarily arrest the same at an adjustable lower level for effecting the knotting of a broken yarn or thread, whenever such a break occurs.

7. The invention of claim 6 wherein the several rotative accumulator-rolls are individually journaled intermediate anti-friction bearings; and wherein all of said rolls are equally spaced in a common horizontal plane, when in the position for normal operation of the machine; and wherein the carriage-borne rolls are also lowered to a common horizontal plane.

8. The invention of claim 6 wherein the carriage comprises opposing runways having lengthwise tracks; wherein an accumulator-roll is mounted between the respective opposing runways by suspension-members and said roll includes means, coactive with the associated track, for individual gravity passage therealong in one direction; wherein mechanism is operative to consecutively return the accumulator-rolls in a reverse order of progression to normal level; means operative to release the initially-movable roll; a catch-trip device effective to receive and hold the last mentioned roll at the limit of its gravitational movement; and an adjustable coordinator intermediate the catch trip device of each runway and the suspension-member of the adjoining runway.

9. The invention of claim 6 wherein the carriage comprises means sustaining opposed runways in rigid inclined parallelism; wherein each runway includes a toothed rack; wherein the individual runways have pivotal suspension-devices in the upper end with an opposingly related bifurcate device fulcrumed in the lower end thereof; wherein a freely-rotative accumulator-roll is supported by each pair of opposing suspension-devices; and wherein spaced pinions on the axis of said roll mesh the runway racks for gravitational descent and mechanical elevation respectively.

10. The invention of claim 6 wherein the carriage comprises means sustaining opposed runways in rigid inclined parallelism; wherein each runway includes a toothed rack; wherein the individual runways have pivotal suspension-devices fulcrumed in the lower end thereof; wherein a freely-rotative accumulator-roll is supported by each pair of opposing suspension devices; wherein pinions proximate the ends of the roll, and secured to the axis of rotation thereof, mesh the toothed rack aforesaid; wherein spring influenced crank and adjustable-connectors operatively coordinate the several roll suspension and bifurcate devices for consecutive actuation; wherein a counterbalance eases movement of the carriage; and wherein a manually-actuable lever and linkage means serves for raising and lowering said carriage.

11. The invention of claim 6 further including adjustable stop devices shiftable to determine the limit of downward movement of the carriage; and wherein a stationary stop arrests upward movement of said carriage when in the lowered position.

12. The invention of claim 6 wherein one of the respective carriage-borne accumulator end rolls further includes means effective to actuate an electric limit device, whereby the machine is switched from a main drive circuit to a "jog" circuit, and contrariwise.

13. In a yarn or thread beaming machine, a series of freely-rotative spacedly-paralleling accumulator-rolls, alternate of which are stationarily-sustained with the intervening ones suspendingly-supported by a common carrier; means whereby the carrier-borne rolls are consecutively released for gravitational descent to a determinate level below the stationarily-supported rolls; means whereby the carrier-borne rolls are automatically elevated in reverse order to that of their consecutive descent; a normally inactive clamp device, proximate the leading accumulator roll, permitting free passage of the lay of yarn or thread through said rolls; means for moving the clamp into grip engagement with said lay of yarn or thread to temporarily arrest withdrawal from the source of supply; and manually actuable means whereby the carrier is lowered to enable retraction of a portion of the beamed yarns or threads to effect the juncture of a broken one, whenever such a break occurs.

14. The invention of claim 13 wherein the clamp device comprises relatively-movable jaws; and wherein a manually shiftable toggle device controls operation of said jaws.

15. The invention of claim 13 wherein the clamp device comprises a stationary jaw and a vertically movable jaw; wherein toggle means operatively coordinate the movable jaw to a manually rotative shaft; and wherein a trip member carried by said shaft coacts with the shifter of an electric limit switch.

16. The invention of claim 13 wherein the carrier raising and lowering means includes stationarily-supported manually-movable angle-lever; and wherein a lateral projection from the angle lever is engageable by a spring influenced hook-latch to hold the carrier elevated.

JOHN C. BODANSKY.

REFERENCES CITED

The following references are of record in the file of this patent:

UNITED STATES PATENTS

| Number | Name | Date |
| --- | --- | --- |
| 2,324,611 | Lambach | July 20, 1943 |

FOREIGN PATENTS

| Number | Country | Date |
| --- | --- | --- |
| 1,134 | Great Britain | May 6, 1861 |
| 277,671 | Great Britain | Apr. 26, 1928 |